July 30, 1957  A. K. DAS GUPTA  2,801,181
HIGH DIELECTRIC CAPACITORS
Filed Aug. 14, 1953  2 Sheets-Sheet 1

INVENTOR.
ASRU K. DAS GUPTA
BY
Ostrolenk & Faber
ATTORNEYS

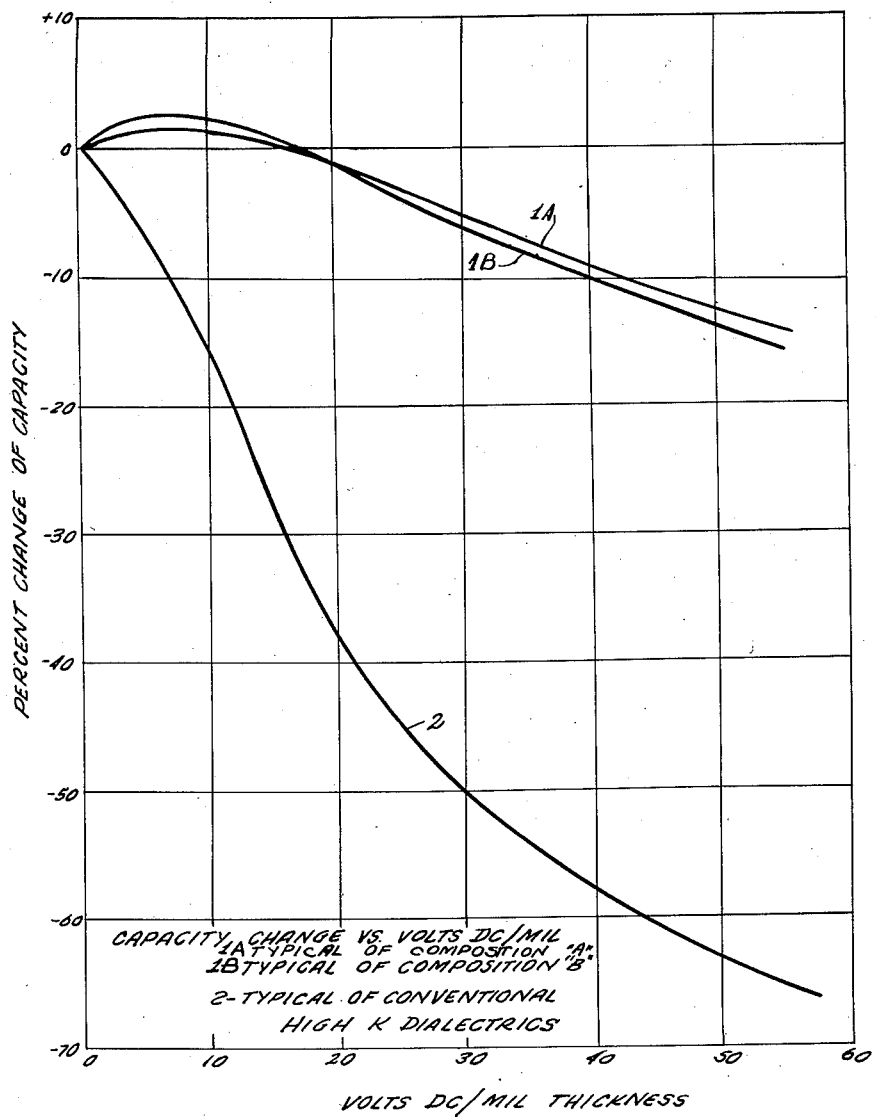

United States Patent Office 2,801,181
Patented July 30, 1957

2,801,181

HIGH DIELECTRIC CAPACITORS

Asru K. Das Gupta, Huntington Park, Calif., assignor to Solar Manufacturing Corporation, Los Angeles, Calif., a corporation of New York Application August 14, 1953, Serial No. 374,381

4 Claims. (Cl. 106—39)

The present invention relates to a novel electrical capacitor and its manufacture and more particularly relates to a novel composition of ceramic for capacitors having a temperature stable high dielectric constant.

It is well-known that in both electronic and industrial applications need has always been felt for capacitors of high capacitance value, and up to the present time essentially mica and electrolytic capacitors have been used for such applications.

Of the two types, mica capacitors are generally suitable where a high Q is desirable, whereas electrolytic capacitors are used where the Q is relatively unimportant.

Unfortunately, due to shortages of capacitor grade mica and to inherent defects in mica such as inclusion of ferritic minerals, the use of mica has been limited.

This necessitated the use of other dielectric materials such as high dielectric constant ceramics. Examples of such high dielectric constant ceramics are found in the barium titanate type of material which has a power factor of 3.5% average normal value, not as good, therefore, as mica which has a power factor of less than 0.1% average normal value but certainly an improvement over the commercially available electrolytic capacitors having power factors of 6 to 16% average normal value.

By using combinations of barium titanate, strontium titanate, zirconates of calcium, strontium, magnesium and stannates of calcium, barium, strontium and other minor additions such as fluoride, it was possible to develop a whole series of compositions having a range of dielectric constants as high as 20,000, having also different values of power factors and capacitance-temperature relationships.

The temperature ranges at which these materials containing barium titanate were measured has always been restricted within the temperature range of approximately $+20°$ to $+150°$ by earlier authors and patentees.

It was found, however, that capacitors used for bypassing and filtering and having a capacitive range from 1,000 micromicrofarads to 20,000 micromicrofarads and using the above-mentioned high dielectric constant ceramic dielectrics have, when the best grade of material is selected from a combination of titanates, zirconates and stannates, exhibited at least a 20% change of capacity with respect to 25° C. at the extreme temperatures when the temperature range of from $-55°$ C. to $+85°$ C. is used.

It was found experimentally that the peak of the capacitance vs. temperature curve for these capacitors shifted from $-55°$ to $+85°$ depending upon their composition.

Although, as previously mentioned, these capacitors are generally used as by-pass or filter capacitors and, therefore, do not have to meet too stringent requirements, the fact that their capacitance varies by approximately 20% with variation of temperature may, however, be sufficiently critical so as to discourage the use of such high dielectric constant ceramics.

For example, if in a filter circuit, a 5,000 micromicrofarad capacitor is needed and a ceramic capacitor having a nominal value of 5,000 micromicrofarads is selected at random, it may prove to be useless as a filtering capacitor when in service if it happens to have a substantial drop in its value of capacitance at a high temperature or at lower temperatures where these temperatures may, for example, be the ambient temperatures at which the filter circuit is to be operated.

The need then for a high dielectric constant ceramic stable with respect to temperature changes becomes quite apparent. This need is further enhanced for in many military applications classes of ceramic capacitors are sought having a high value of capacitance, being of relatively small size and the capacitance of which can change only up to a definite predetermined value, for example, 15 to 20% and such that its capacity should not vary from its nominal value at any temperature between a specified range, for example, $-55°$ C. to $+85°$ C. or higher.

The present invention consists then in a novel ceramic having a high dielectric constant and at the same time having the desired stability with respect to temperature changes.

Accordingly, the main object of the present invention is a novel capacitor having a relatively high and temperature stable capacitance.

Another object of the present invention is a novel capacitor having a high capacitance which is stable within the temperature range of $-55°$ C. to $+85°$ C.

Still another object of the present invention is a novel capacitor having a high and temperature stable capacitance and a low power factor or high Q at 1 kilocycle frequency.

A still further object of the present invention is a novel ceramic dielectric having a temperature stable high dielectric constant.

Still another object of the present invention is a novel ceramic composition having a temperature stable high dielectric constant and a very low power factor.

Still another object of the present invention is the method of manufacturing a ceramic composition having a temperature stable high dielectric constant.

This novel ceramic composition uses as its major constituent barium titanate to which are added minor amounts of columbates of barium, magnesium, strontium and calcium, singly or in combination, in definite proportion. A calcium titanate additive may also be utilized in the composition. The calcium titanate serves to improve the maturing characteristics but does not significantly contribute to the temperature characteristics of this novel temperature stable high dielectric ceramic material.

Furthermore, in addition to having a low power factor, the composition of the present invention has a voltage co-efficient of capacitance characteristic that is better than that of conventional high dielectric constant ceramics.

A further object of the present invention is a capacitor having a good voltage co-efficient of capacitance characteristic.

The foregoing and many other objects of the invention will become apparent in the following description and drawings in which:

Figure 2 is a plot of percentage capacity change with respect to D. C. voltage applied per mil of thickness of both ceramic compositions of the present invention and of conventional high K dielectrics.

Figure 1:
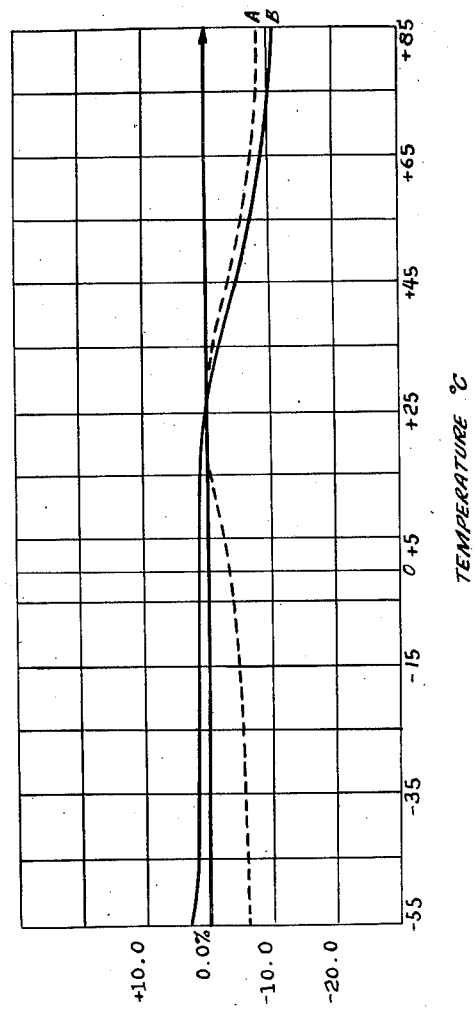
Figure 1 is a plot of the percentage change in dielectric constant of two of these novel ceramic compositions with respect to temperature.

Referring then to Figure 1, the horizontal reference axis is there taken at the temperature axis and is positioned at 0.0%. The vertical axis is taken to represent percent capacity changes in respect to the value of capacitance at 25° C. Therefore, the 0.0% corresponds to no capacity change from the value of capacitance of 25° C.

In Figure 1 the solid line indicated by letter B represents the temperature variation of the capacitance for a capacitor using the following compositions.

| | Weight Percent |
|---|---|
| Barium titanate (BaO TiO$_2$) | 90.0 |
| Barium columbate (BaO Cb$_2$O$_5$) | 5.0 |
| Barium zirconate (BaO ZrO$_2$) | 1.0 |
| Barium stannate (BaO SnO$_2$) | 1.0 |
| Magnesium oxide-columbium penta-oxide mixture (2.4 Mgo.Cb$_2$O$_5$) | 1.0 |
| Calcium titanate (CaO TiO$_2$) | 2.0 |

It will be seen with reference to Figure 1 that the maximum variation in capacitance occurs at approximately +85° C. and there the variation is only of −10% from its value at 25° C.

The dashed line denoted by reference letter A shows also the temperature variation of the capacitance of capacitors having as dielectric the ceramic composition of the following compositions:

| | Weight percent |
|---|---|
| Barium titanate (BaO TiO$_2$) | 90.0 |
| Barium columbate (BaO Cb$_2$O$_5$) | 4.0 |
| Barium stannate (BaO SnO$_2$) | 2.0 |
| Magnesium oxide-columbium penta-oxide mixture (2.4 Mgo.Cb$_2$O$_5$) | 1.0 |
| Calcium titanate (CaO TiO$_2$) | 1.0 |
| Strontium titanate (SrO TiO$_2$) | 2.0 |

For these two compositions, from now on referred to as compositions B and A, respectively, the maximum value of capacitance obtainable for given dimensions of dielectric discs are as follows:

| | Micromicrofarads |
|---|---|
| ¼″ disc | 500 |
| ⅜″ disc | 1,200 |
| 17/32″ disc | 2,500 |

The electrical characteristics of both of these capacitors meet the following specifications:

| | |
|---|---|
| Working voltage | 600 v. D. C. |
| Power factor | 1.5% or less at 1 kc. |
| Insulatin res | 1000K megs or greater. |

While above two examples were given of ceramic compositions using as base material barium titanate and as temperature compensating materials different columbates, the percentage range of the various components with which it is possible to obtain temperature stable high dielectric constant ceramics is as follows:

Barium titanate—92 to 97 by weight where its percentage may include also an additive such as calcium titanate ranging from 0 to 4%. Thus, exclusive of additive, the barium titanate content may vary from 88 to 97 percent. In barium titanate, BaO:TiO$_2$=1:1.

Magnesium oxide-columbium penta-oxide mixture—0 to 6.5% where the mole ratio of magnesium oxide to Cb$_2$O$_5$ ranges from 1.5:1 to 3:1.

Barium (stannate or zirconate)—0 to 6.5% where BaO:SnO$_2$=1:1 and BaO:ZrO$_2$=1:1.

Barium columbate—2.5 to 8% where BaO:Cb$_2$O$_5$=1:1. From the above, it can be seen that the columbates will be present in minor amounts up to about 8 percent.

When the percentage range of these components is the one listed above, then it was found that the dielectric constants from 500 to 2,500 are obtainable with a power factor of 1.5% or less at 1 kc.

From the value given above, it will be seen that this class of ceramic compositions has a relatively low power factor. In addition, it was found that they have a considerably better voltage co-efficient of capacitance characteristics i. e. the capacitance change with increased voltage is comparatively small when compared with the capacitance drop noted in conventional high K dielectrics (see Figure 2).

In fact (see Figure 2), under a potential of 30 volts/mil the capacity change of this novel material is only 6 to 8% from the value measured at .3 volt/mil whereas in conventional high dielectric constant ceramics the capacity under the same potential change may drop from 18 to as much as 70% of the initial value.

As for the manufacture of this novel ceramic, the various compositions are compounded using barium titanate, the carbonates of barium and magnesium, calcium titanate and optionally strontium titanate.

As for the columbium oxide, it is the oxide of pentavalent columbium having the chemical formula Cb$_2$O$_5$.

All the materials needed are first weighed in a dry powder form and then mixed for six hours in a watery solution in what is generally called a wet ball milling process.

At the end of six hours or at the end of the wet ball milling process, the milling contents are dried in a pan of stainless steel. Then a temporary paraffin wax binder is added to the now dried material after which the material is screened for the proper granulation. The binder evaporates during the early stages of firing. The granules must pass through a screen having openings of from 28 to 80 Tyler mesh size. The finer and coarser granules are reworked.

Then by conventional pressing techniques these granules are pressed into disc shape of approximately ⅝″ in diameter and .045″ thick using a pressure of approximately 1,000 p. s. i.

The now pressed shapes are placed on zirconia sand and by a simple commercial firing process they are vitrified in an electric or gas furnace. The rate of heating for the firing process is approximately 400 to 500° per hour to the maximum temperature which, depending on the composition, is between 2400 and 2600° F. and allowed to remain at that temperature for 1½ hours. For compositions A and B the temperature is 2525° F. for 1½ hours in an electric periodic furnace.

After this time the furnace is shut off and allowed to cool overnight or for a period of ten or twelve hours.

Finally silver paste is applied to each side of the discs and fired at a temperature of approximately 1600° F. This forms the electrodes of the dielectric.

It should be noted that the electrical evaluations given above for compositions A and B were performed twenty-four hours after the silver firing process.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. A ceramic composition for capacitors consisting essentially of 92 to 97 percent barium titanate, said barium titanate including 0 to 6.5 percent of a magnesium oxide-columbium penta-oxide mixture wherein the mol ratio of magnesium oxide to columbium penta-oxide is in the range of 1.5:1 to 3:1, 0 to 6.5 percent of a member from the group consisting of barium stannate and barium zirconate and from 2.5 to 8 percent barium columbate.

2. The composition of claim 1 including up to 4 percent of a calcium titanate additive.

3. A ceramic composition for capacitors comprising 88 to 97 percent barium titanate and a small amount not exceeding 8 percent of barium columbate sufficient so that the capacitance thereof does not vary more than 20 percent between temperatures of from −55° C. to +85° C.

4. A ceramic composition for capacitors comprising 88 to 97 percent barium titanate and a small amount not exceeding 6.5 percent of a magnesium oxide-columbium penta-oxide wherein the mol ratio of magnesium oxide to columbium penta-oxide is in the range of 1.5:1 to 3:1, so that the capacitance thereof does not vary more than 20 percent between temperatures of from −55° C. to +85° C.

No references cited.